(United States Patent — Ewing)

Patent Number: 4,621,958
Date of Patent: Nov. 11, 1986

[54] METAL BORING TOOL

[76] Inventor: Harry R. Ewing, R.D. 4 Box 31A, Titusville, Pa. 16354

[21] Appl. No.: 676,452

[22] Filed: Nov. 29, 1984

Related U.S. Application Data

[63] Continuation of Ser. No. 314,708, Oct. 26, 1981, abandoned.

[51] Int. Cl.$^4$ .............................................. B23B 29/03
[52] U.S. Cl. .................................... 408/232; 408/147; 408/197; 408/713; 408/239 R; 407/46; 407/48; 407/109
[58] Field of Search ............... 408/186, 187, 188, 181, 408/239 R, 185, 197, 232, 233, 231, 713, 23, 147, 240; 407/34, 46, 48, 101, 109, 110

[56] References Cited

U.S. PATENT DOCUMENTS

| | | | |
|---|---|---|---|
| 1,392,304 | 10/1921 | Davis | 408/179 |
| 1,881,024 | 10/1932 | Lang | 408/713 |
| 3,617,144 | 11/1971 | Koppelman | 408/187 |
| 3,704,958 | 12/1972 | Gulibon et al. | 408/181 |
| 3,785,746 | 1/1974 | Wolf et al. | 408/188 |

Primary Examiner—Gil Weidenfeld
Assistant Examiner—Thomas M. Kline
Attorney, Agent, or Firm—Charles L. Lovercheck; Wayne L. Lovercheck; Dale R. Lovercheck

[57] ABSTRACT

A boring block and tool holder is disclosed having an opening therein. The block is made of a thick rectangular plate having inserts set into its front corners and inclined surfaces adjacent its rear edge forming a non-circular tang part having two rearwardly facing shoulders adjacent the tang portion which is received in a slot in a boring bar. The shape of the slot is complimentary to the shape of the tang part of the block. A tapered hole through the tang aligns with a tapered hole in the boring bar and the tapered hole in the block receives a taper pin which forces the block rearward bringing the block into firm rigid relationship with the end of the bar thereby clamping the block in positive rigid relation to the bar. The block has more strength than previous blocks because the block is thicker below the cutting inserts and there is more metal below the cutting insert, yet it can use the same bar and same slot width as rectangular blocks.

1 Claim, 11 Drawing Figures

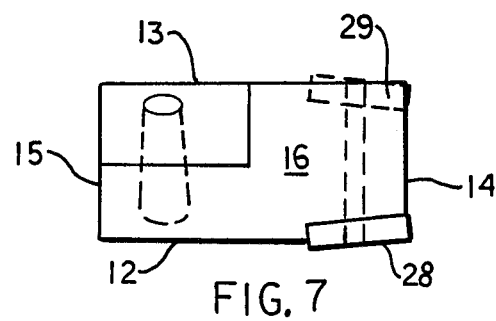
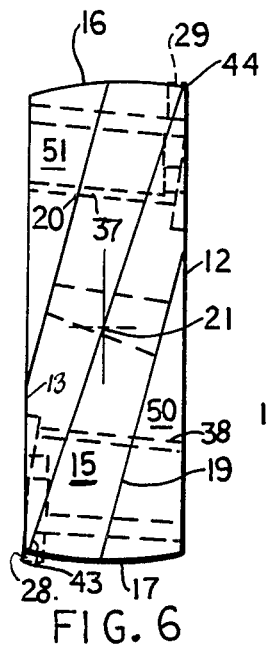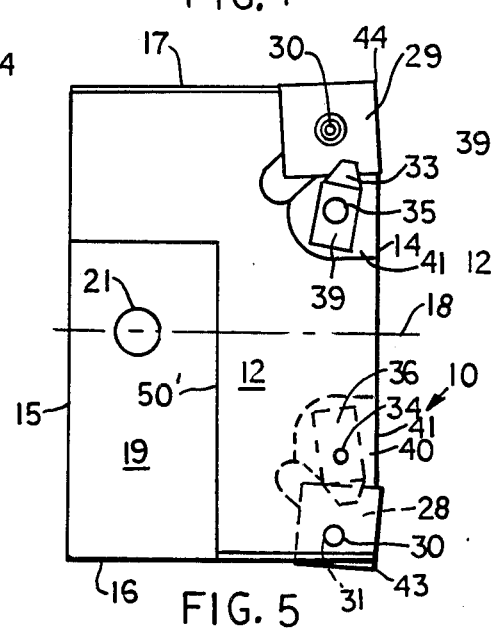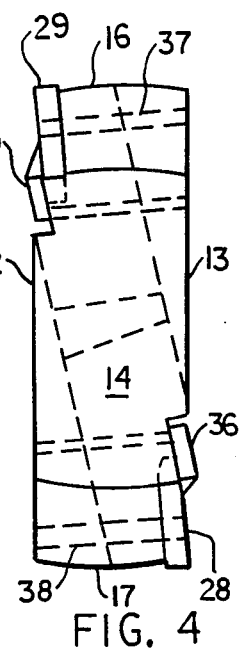
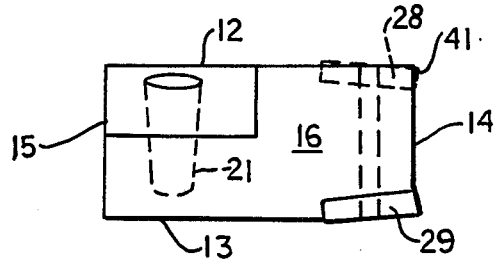

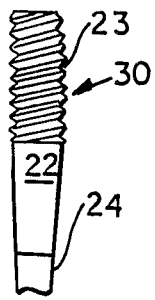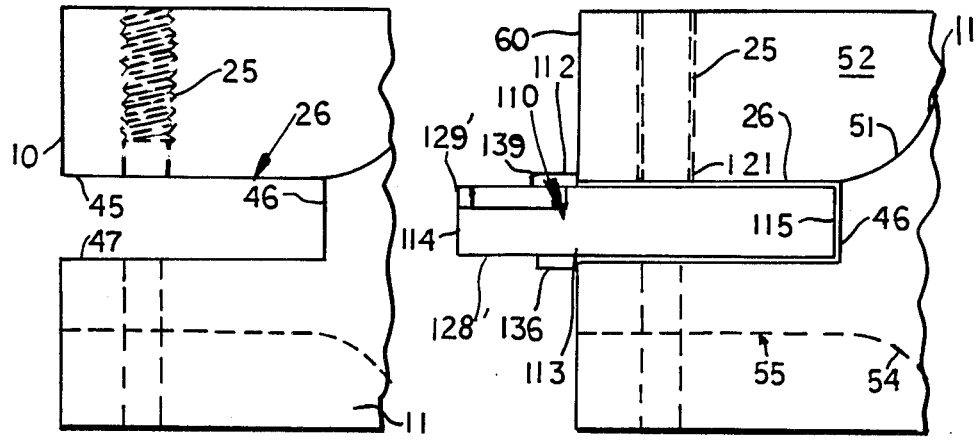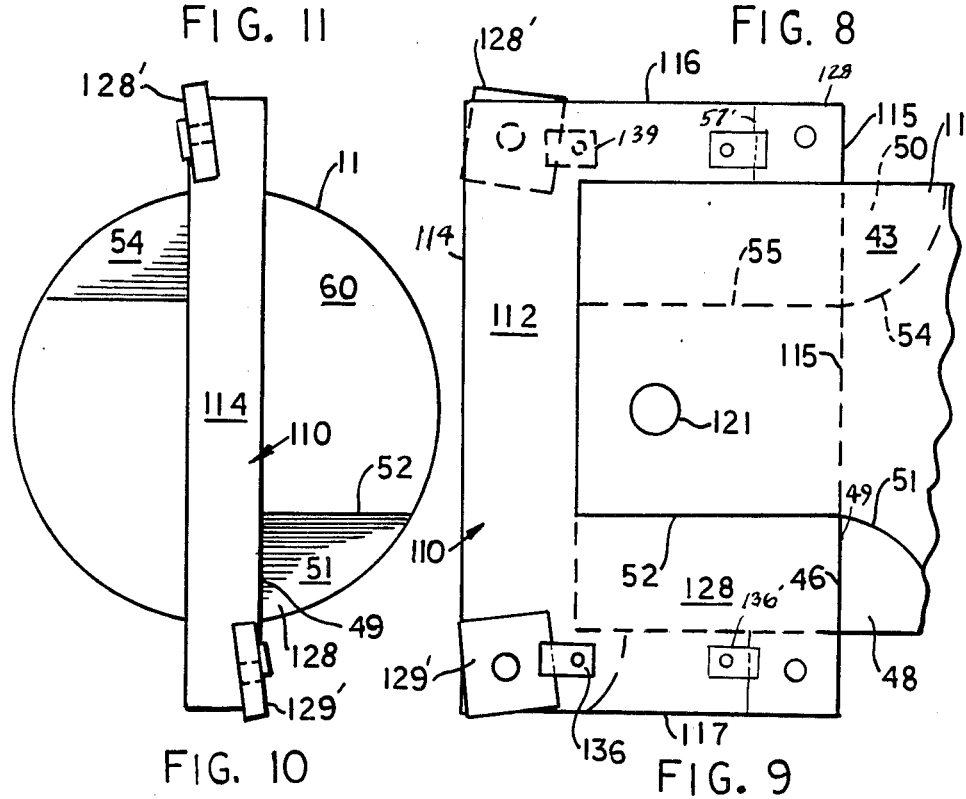

4,621,958

METAL BORING TOOL

GENERAL DESCRIPTION

This is a continuation of application Ser. No. 314,708, filed Oct. 26, 1981, now abandoned.

The boring tool disclosed herein is suitable for rough boring with machines which are required to remove heavy cuts from steel parts. The tool uses ordinary carbide inserts which may be located on the block at predetermined angles. Two inserts, one on each end of the block, balance the force on the inserts and make it possible to increase feed rates of the machine to remove heavy cuts of stock from a bore in one pass, for example, three quarter inch deep cuts. The inserts are clamped in a recess in the block and the block is held in the bar rigidly against a reference surface by a taper pin. The block is effectively thicker than previous blocks, yet it can be used in a bar for thinner blocks. Therefore, the block is stronger and more rigid and has more material supporting the inserts than a rectangular block.

REFERENCE TO PRIOR ART

Tool bars, according to previous designs, were held together by parts that had certain weak points. The tool disclosed herein is designed to be rigidly supported in a boring bar for heavy rough cuts in metal.

Examples of prior art are found in U.S. Pat. No. 4,003,670 issued to Richard Ewing on Jan. 18, 1977, which shows one form on a boring tool. Applicant has improved the tool disclosed in the aforementioned patent.

OBJECTS OF THE INVENTION

It is an object of the invention to provide an improved tool holder.

Another object of the invention is to provide a tool holder that is very rigid and will retain its accuracy and withstand extremely high pressures and usage as in removing heavy cuts from steel parts.

Another object of the invention is to provide a tool holder that is simple in construction, economical to manufacture and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

GENERAL DESCRIPTION OF DRAWING

FIG. 3 is a side view of the boring block.

FIG. 4 is a front view of the boring block.

FIG. 5 is a top view of the boring block.

FIG. 6 is a rear view of the boring block.

FIG. 7 is a side view of the boring block.

FIG. 8 is a view similar to FIG. 2 of another embodiment of the invention.

FIG. 9 is a top view of the embodiment shown if FIG. 8.

FIG. 10 is an end view of the embodiment of FIG. 8.

FIG. 11 is a view similar to FIG. 8 with the blocks removed.

DETAILED DESCRIPTION OF INVENTION

Figure 1:
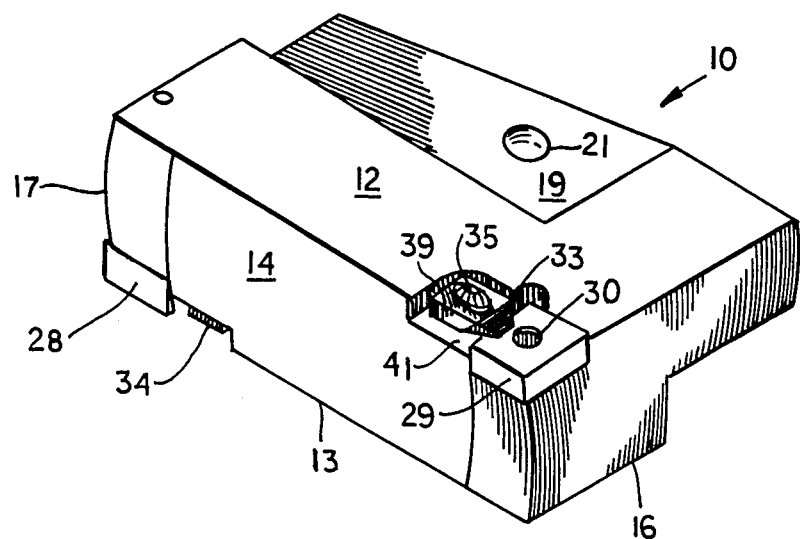
FIG. 1 is a perspective view of the boring tool according to the invention.

Now with more particular reference to the drawings, the boring tool or tool holder disclosed herein is used in a conventional type boring bar with plate shaped holder received in slot 26 held by taper pin hole 21. The boring tool 10 when supported on the outer end of a boring bar 11, it is extremely rigid and will withstand heavy boring pressure. In the said patent, the taper pin forces the block into engagement with the bottom of the slot. In the present invention, the dimension from end of the bar to the hole for the pin is controlled in the same bar so that the two blocks are interchangeable. A holder such as holder 10 that is substantially thicker than the width of the slot in the bar can be inserted in the slot 26. Slot 26 divides the end of the bar into a first, upper lip and a second, lower lip. When a plain plate shaped tool holder like the one used in the prior patent in used, the holder can be no thicker than the width of the slot. in the bar. Thus a tool holder that is substantially thicker and therefore stronger can be use when made according to the present invention.

The boring tool has a body shown in the drawings in combination with the boring bar 11. The rear half of the block 10 may be referred to as the tang end which is noncircular in cross section having a top inclined surface 19 and the bottom inclined surface 20 which are parallel to each other and rest on the two parallel surfaces defining the sides of the slot in bar 11. The top surface 19 extends from the end 17 toward the edge 16 and terminates at the top 12. Inclined surfaces 19 and 20 are parallel to each other and each inclined surface rests on one of the surfaces defining the slot. The inclined surface 20 extends from the edge 16 toward the end 17 and terminates at the bottom 13. The inclined surface extends approximately half way from the rear 15 toward the front 14 and terminating at rearwardly facing shoulder 50' and 51 and the tapered hole 21 is formed from inclined surface 19 to the inclined surface 20. Tapered hole 21 is suitable for receiving a tapered pin which extends through the tapered hole in the block and through the bar 11. The tapered pin has an upper end 23 that is threaded and received in a suitable threaded hole 25 in the bar while the lower end 24 is cylindrical and is received in a cylindrical hole in bar 11 below the block 10. Thus the tapered pin 30 forces the block 10 rearward so that the shoulders 50' which terminate at the inclined surfaces 19 and 20 of the block 10 rest firmly against the end 60 of the bar. The taper pin therefore pre-stresses the block thereby placing the shoulders in compression against the front edge of the bar.

A first insert receiving recess is formed adjacent the front end 14 and side 16 and extends downward from the top 12 toward the bottom 13 and receives the first insert 29. A similar recess 40 is formed adjacent the front 14 adjacent the bottom 13 and the side 17 and it receives a second insert 28. Clamp 39 is received in a clamp receiving recess shallower than recess held to the block by a screw 35 and it rests on the insert 29 and on the bottom 41 of the first recess holding the insert 29 to the bottom of the recess. The insert is further held in place by a central screw 30.

The bottom of the insert receiving recesses are disposed at an acute angle to the to surface 12 and the bottom surface 13 and approximately parallel to the inclined surfaces. The square inserts have their sides inclined to the sides 16 and 17 of the block 10. The front edge of each insert is inclined to the front of the block at for example 5 degrees.

It will be noted from FIG. 6 that the outer corner point 44 of the insert 29 and the outer point 43 of the insert 28 are on the line passing through the central axis of the block indicated at 18.

The tang end of block 10 is received in a slot 26 in the outer end of the boring bar 11. The slot 26 is complimentary in shape to the tang end of the block 10. The block body 10 is in the form of a rectangular section of a heavy plate which may be for example 3 inches long by 2 inches wide by 1 inch thick, the top 12 and bottom 13 being parallel to each other.

When mounted in the slot in the boring bar 11 the block 10 is rotated about the central axis 18 and the inserts 28 and 29 cut on the inside of a bore in a work piece to be machined. The inserts are shown as square bodies but could be of any well known or special shape.

The points 43 and 44 of the inserts are located on a line passing through the center point of the body 10 on the center line indicated in FIG. 6. The screws holding the clamps are received in holes 37 and 38 which extend entirely through the body.

It will be noted that the bottoms of the pockets receiving inserts are disposed at an angle at approximately five degrees to the top surface 12 and the bottom of the pocket receiving the clamps 36 and 39 are parallel to the bottom of the pockets receiving the inserts so that the clamps hold the inserts in position. This inclined tang provides better chip egress. The clamps 36 and 39 and inserts 28 and 29 are of a type familiar to those skilled in the art.

Figure 2:
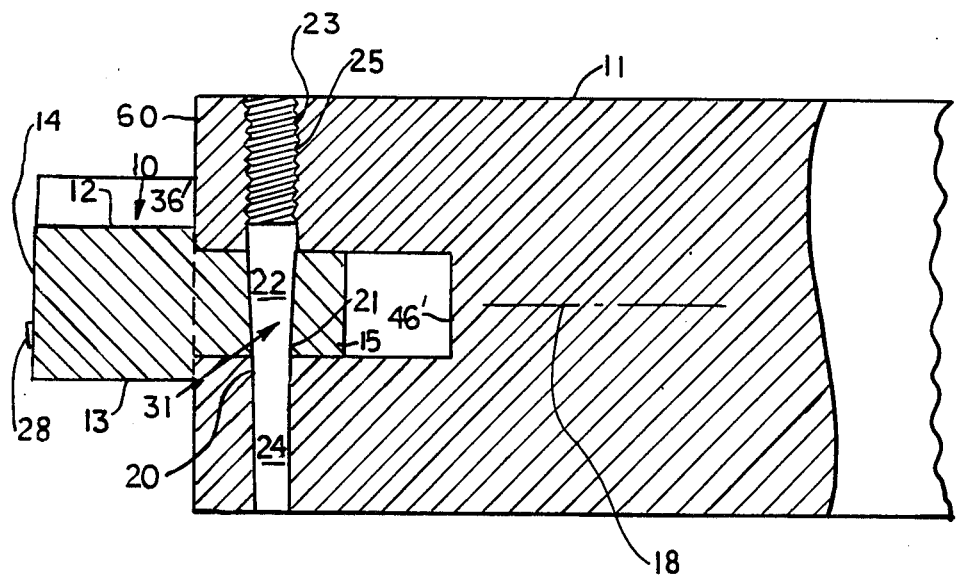
FIG. 2 is a longitudinal cross sectional view of the boring block of FIG. 1 shown supported in a boring bar.

In the embodiment of the invention shown in FIGS. 8, 9, and 10, I show the same boring bar 11 as shown in FIG. 2, however, in the embodiment of FIGS. 8, 9, and 10, a rectangular boring block with top 112 and bottom 113 parallel to each other as shown received in the slot in the block. Both the block 10 in FIGS. 1 through 8 and the block 110 in the embodiment of FIG. 8 through may be used in the same boring bar even though the block 10 is wider than the slot, since the inclined surfaces of the block 10 are spaced apart the same distance as the width of the slot. The block 10 has the advantage that the plate making up the block 10 is thicker than block 110 yet can be used in the same boring bar, received in the same slot as receives the block 110.

The rear end 115 of the block or holder rests on the bottom of slot 126.

The block has a top 112, bottom 113, front 114, rear 115, first end 116, and second end 117. It will be noted that the rear 115 rests on the bottom 46 of the slot and is forced into engagement with it by the pin 121 having a tapered section received in the tapered hole 121 in the block. The tapered hole 121 is spaced equal distance from the front 114 and the rear 115 of the block so that the block 110 can be removed and reversed, placing the front 114 against the bottom 46 of the slot so that the block can be used for dual purpose. The block or holder 110 has the inserts 128 and 129 located adjacent the ends 116 and 117 and adjacent the front 114 the block likewise has insert 128' and 129' adjacent the rear end 115 of the block.

It will be noted that the bar 11 has a slot 26 which has two parallel sides 45 and 46 and a bottom 47 and holes 24 and 25. A first recess 48 is formed at one side of the bar and a second recess 50 is formed at the opposite side of said slot. The first recess 48 has a planar bottom surface 49 which lies in the same plane as top surface 45 of the slot and terminates at curved surface 51. Surface 52 is disposed perpendicular to the top surface 45 of slot 26. Second recess 50 has a flat surface 53 which is disposed in a common plane with the bottom surface 46 of slot 26 and extends from the bottom 46 of slot 26 to curved surface 54. Recess 50 also has a flat surface 55 disposed perpendicular to surface 45 of slot 26.

It will be seen that the recesses 48 and 50 provide spaces for chip egress from the inserts 28 and 29 in the embodiment of FIGS. 1 through 7, and from inserts 128 and 129 in the embodiment of FIGS. 8, 9 and 10. It will also be seen that the block 10 will fit in a slot of the same width as block 110 will fit into even though block 10 is much thicker. This is due to the fact that the inclined surfaces are formed on block 10. Also by making the tapered hole 121 half way between front edge 114 and rear edge 115, the block is reversable and inserts 128 and 129' can be used for cutting in the opposite direction from inserts 128 and 129. It will also be seen that the devices disclosed can be used by rotating the work and the bar relative to each other, either by holding the work and rotating the bar or by rotating the work and holding the bar.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination a boring bar 11 and a block 10,
   said boring bar 11 having a body comprising a first end portion having a first end having a flat planar end surface and a second end portion, a rectangular slot 26 extending through said end surface 60 into said bar dividing said first end portion of said bar into an first, upper lip and a second, lower lip,
   said first, upper lip and said second, lower lip being integrally attached to said bar 11,
   said slot 26 being defined by a first planar surface, a second planar surface and a third planar surface 46',
   said third planar surface 46' defining the bottom of said slot 26,
   said first planar surfaces and said second surface being parallel to each other and disposed generally perpendicular to said third planar surface 46' and to said end surface 60 and extending through the sides of said bar providing said slot 26 with an open front end, open sides and said second bottom,
   a first threaded hole 25 extending through said first, upper lip from one side thereof to said slot 26,
   a second cylindrical hole extending through said second, lower lip,
   said block 10 being made from a flat plate having a top 12, a bottom 13, a first side 16, a second side 17, a first end 14, and a second end 15,
   a first flat inclined planar surface 19 extending from said second side 17 towards said first side 16 at an acute angle to said top 12 and a second inclined planar surface 20 extending from said first side 16 toward said second side 17 at an acute angle to said bottom 13 and disposed in a plane parallel to the plane of said first inclined surface 19, said block 10 having a thickness between said top 12 and said bottom 13 substantially greater than the width of said slot 26 between said parallel planar side surfaces defining said slot, said inclined planar surfaces 19, 20 each terminating in rearwardly facing shoulders 50, 51, said flat inclined planar surfaces 19, 20 being spaced from each other a distance substantially equal to the width of said slot 26 in said bar, said block 10 being received in said slot 26 in said bar with said inclined planar surfaces 19, 20 of said block engaging on said first and said second parallel planar surfaces defining said slot 26, a first recess and a second recess in said block, each said recess having a flat bottom surface, said bottom surfaces of said recesses being disposed in planes generally parallel to the plane of said inclined top and said bottom surfaces on said block, said first recess in said block being disposed adjacent said first end 14, said top 12 and said first side 16 and spaced from said second end 15, said first cutting insert 28 in said first recess resting on said flat bottom thereof, said second recess being disposed adjacent said first end 14 and adjacent said second end 17 and said bottom 13 and spaced from said second end 15, a second cutting insert 29 is attached to said block 10 in said second recess resting on said flat bottom thereof, said rearwardly facing shoulders 50, 51 of said block resting on said end surface 60 of said bar 11, and a tapered hole 21 in said block 10 extending from said first inclined surface 19 to said second inclined surface 20, a pin 31 having a threaded first end 23, a tapered intermediate part 22 and a cylindrical second end 24, said pin 31 extending through said first threaded hole in said first, upper lip, said tapered intermediate part 22 of said pin 31 being received in said tapered hole 21 in said block 10 and said cylindrical end 24 of said pin 31 being received in said cylindrical hole in said second, lower lip urging said shoulders 50, 51 into firm engagement with said end surfaces 60 of said bar 11 whereby said shoulders 50, 51 are placed in compression against said front end 60 of said bar 11.

* * * * *